United States Patent

[11] 3,627,800

[72] Inventors William J. Owen
Penarth;
Bryan E. Cooper, Bridgend, both of Wales
[21] Appl. No. 27,104
[22] Filed Apr. 9, 1970
[45] Patented Dec. 14, 1971
[73] Assignee Midland Silicones Limited
Berkshire, England
[32] Priority Apr. 11, 1969
[33] Great Britain
[31] 18,780/69

[54] ORGANOSILICON COMPOUNDS
4 Claims, No Drawings
[52] U.S. Cl. .................................................... 260/448.2 N,
260/448.8 R, 260/45.7 R
[51] Int. Cl. ...................................................... C07f 7/02,
C07f 7/04
[50] Field of Search ............................................. 260/448.2
N, 448.8 R

[56] References Cited
UNITED STATES PATENTS
3,172,874 3/1965 Klebe ........................... 260/448.2 N
3,311,651 3/1967 Niederprum et al. .......... 260/448.2 N Primary Examiner—Delbert E. Gantz
Assistant Examiner—Werten F. W. Bellamy
Attorneys—Robert F. Fleming, Jr., Laurence R. Hobey and Howard W. Hermann ABSTRACT: Organosilicon compounds defined by the formula

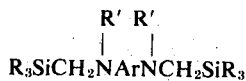

are prepared by reacting $R_3SiCH_2X$ with $HR''NArNR''H$, where R is an alkyl, alkenyl, alkoxy or aryl radical, R' is H, alkyl or $R_3SiCH_2-$, X is Cl, Br or I, R'' is H or alkyl and Ar is phenylene or diphenylene. These compounds are useful as oxidation and ozone inhibitors in organic rubbers and polymeric materials and as oxidation detection additives.

ORGANOSILICON COMPOUNDS

This invention relates to novel organosilicon compounds and to a process for their preparation.

According to the invention, there are provided organosilicon compounds of the general formula

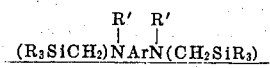

wherein Ar represents the phenylene or diphenylene radical, each R represents an alkyl, alkenyl, alkoxy or aryl radical and each R' represents a hydrogen atom, an alkyl radical or a $R_3SiCH_2$ group, with the proviso that when R' is an alkyl radical or $R_3SiCH_2$— group not more than one R radical attached to any silicon atom has more than four carbon atoms.

In the general formula of the compounds of this invention, Ar represents the phenylene, —$C_6H_4$—, or diphenylene, —$C_{12}H_8$—, radicals, preferably paraphenylene and p-diphenylene. The R radicals which can be the same or different are selected from alkyl radicals, for example, methyl, ethyl, propyl, decyl and octadecyl radicals, alkenyl radicals, for example, vinyl and allyl radicals, alkoxy radicals, for example, methoxy, ethoxy, butoxy and hexoxy radicals and aryl radicals, for example, phenyl, diphenyl and naphthyl radicals. The R' substituents, which can be the same or different, are selected from hydrogen atoms, alkyl radicals, and $R_3SiCH_2$— groups, in which R is as defined above. When R' represents an alkyl radical or the $R_3SiCH_2$— groups, not more than one R attached to any silicon atom in the molecule can contain more than four carbon atoms.

The compounds of this invention can therefore contain two, three or four $R_3SiCH_2$— groups attached through two nitrogen atoms to a phenylene or diphenylene residue. They can be prepared by a novel process involving the reaction of a phenylene diamine or a diphenylene diamine with a halomethyl substituted organosilicon compound. Also included within the scope of this invention, therefore, is a process for the preparation of the compounds of the invention which comprises reacting together (1) a silane of the general formula $R_3SiCH_2X$, wherein X is Cl, Br or I and R is as hereinbefore defined with (2) a compound of the general formula $HR''NArNR''H$, wherein Ar represents the phenylene or diphenylene radical and each R'' represents a hydrogen atom or an alkyl radical, not more than one R radical in (1) having more than four carbon atoms when R'' in (2) is an alkyl radical.

In order to obtain maximum yield of the desired product, the process of this invention is preferably carried out in the presence of an acceptor for the liberated hydrogen halide and employing a stoichiometric excess of the halomethylsilane (1). Any hydrogen halide acceptor can be employed for this purpose provided it is not reactive with the silane, the preferred ones being pyridine, triethylamine and trimethylamine. If desired, solvents, preferably polar solvents such as the high boiling ethers, can be included in the reaction mixture to facilitate the reaction. Conveniently, however, the hydrogen halide acceptor is chosen such that it is also a solvent for the reactants.

Normally, the application of heat is desirable to facilitate the reaction with reaction temperatures of from about 75° to 175° C. being appropriate in most instances. The reaction can be carried forward at atmospheric, subatmospheric or superatmospheric pressures, the latter being employed when the boiling point of one or more of the reactants is below the desired reaction temperature. Isolation of the product from the reaction mixture can be achieved by conventional means, for example, by extraction with a suitable solvent and fractional distillation.

The compounds of this invention have been found to have oxidation potentials which are lower than those of aromatic diamines and they are, therefore, useful as additives to organic rubbers and other polymers to stabilize such materials against degradation by oxygen or ozone. They also have the property of forming highly colored charge transfer complexes with electron acceptors, for example, they form a transient deep blue color when added to methanol containing oxygen. The compounds of this invention are thus useful for the detection of oxygen.

The following examples in which Me represents the methyl radical illustrate the invention.

EXAMPLE 1

Chloromethyltrimethylsilane (30.6 g., 0.25 mole), p-phenylenediamine (5.4 g., 0.05 mole) and triethylamine (40 ml.) were mixed and heated in an autoclave at 150° C. for 48 hours. The autoclave was then allowed to cool and the reaction mixture recovered and washed under nitrogen with cold aqueous KOH solution. The product was then extracted with diethyl ether and the dried ether fractionated to give

(15 g., 67%) as a pale yellow liquid b.p. 160°/0.5 mm. Elemental analysis gave C, 58.9; H, 10.3; N, 6.8%. $C_{22}H_{45}N_2Si_4$ requires C, 58.4; H, 10.6; N, 6.2%. The infrared and nuclear magnetic resonance spectra were both consistent with the proposed structure.

3µl of the compound was dissolved in 50 ml. of deoxygenated methyl alcohol. The solution as prepared was colorless and was allowed to stand open to the atmosphere for 10 minutes. During this time, the solution assumed a deep blue color. After a further 30 minutes, the blue color had changed to pale red.

EXAMPLE 2

Chloromethyltrimethylsilane (20.5 g., 0.2 mole) and p-phenylenediamine (10.8 g., 0.1 mole) and triethylamine (30 ml.) were heated in an autoclave at 150° C. for 24 hours. When cool, the reaction mixture was washed under nitrogen with cold aqueous KOH solution, extracted with ether and the dried extract fractionally distilled to give a pale yellow solid,

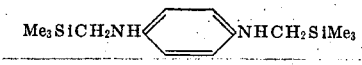

(3.2 g., 11%) b.p. 138°/1.5 mm. Found by elemental analysis C, 60.5; H, 9.9; N, 9.7%. $C_{14}H_{28}N_2Si_2$ requires C, 60.0; H, 10.0; N, 10.0%.

EXAMPLE 3

When example 1 was repeated employing in place of the chloromethyltrimethylsilane, a chemically equivalent amount of each of the following, the indicated products were obtained.

| | |
|---|---|
| $ClCH_2Si(CH_3)_2C_6H_5$ | $\{(C_6H_5Me_2SiCH_2)_2N\}_2C_6H_4$ |
| $BrCH_2SiMe_3$ | $\{(Me_3SiCH_2)_2N\}_2C_6H_4$ |
| $ICH_2Si(CH=CH_2)_3Me$ | $\{[Me(CH_2=CH)_3SiCH_2b]_2N\}_2C_6H_4$ |
| $ClCH_2Si(C_3H_7)_3$ | $[\{(C_3H_7)_3SiCH_2\}_2N]_2C_6H_4$ |

EXAMPLE 4

When example 2 was repeated employing a chemically equivalent amount of P-diphenylenediamine, the product obtained was

That which is claimed is:

1. Organosilicon compounds of the general formula

wherein Ar represents the phenylene or diphenylene radical, each R represents an alkyl, alkenyl, alkoxy or aryl radical, and each R' represents a hydrogen atom, an alkyl radical or a $R_3SiCH_2$ group, with the provision that when R' is an alkyl radical or $R_3SiCH_2-$ group not more than one radical attached to any silicon atom has more than four carbon atoms.

2. Organosilicon compounds as claimed in claim 1 wherein Ar represents the p-phenylene or p-diphenylene radicals.

3. The compound

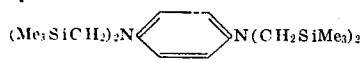

in which Me represents the methyl radical.

4. The compound

in which Me represents the methyl radical.